United States Patent
Feng et al.

(10) Patent No.: US 10,757,129 B2
(45) Date of Patent: Aug. 25, 2020

(54) SOFTWARE SECURITY VERIFICATION METHOD, DEVICE, AND SYSTEM

(71) Applicant: HUAWEI TECHNOLOGIES CO., LTD., Shenzhen, Guangdong (CN)

(72) Inventors: Chengyan Feng, Shenzhen (CN); Jiangsheng Wang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 135 days.

(21) Appl. No.: 15/795,623

(22) Filed: Oct. 27, 2017

(65) Prior Publication Data
US 2018/0063184 A1 Mar. 1, 2018

Related U.S. Application Data

(63) Continuation of application No. PCT/CN2015/078136, filed on Apr. 30, 2015.

(51) Int. Cl.
*H04L 29/06* (2006.01)
*H04L 12/46* (2006.01)
(Continued)

(52) U.S. Cl.
CPC ........ *H04L 63/1433* (2013.01); *H04L 12/46* (2013.01); *H04L 41/12* (2013.01); *H04L 63/12* (2013.01); *H04L 12/40* (2013.01)

(58) Field of Classification Search
CPC ..... H04L 63/1433; H04L 12/46; H04L 41/12; H04L 63/12; H04L 12/40
(Continued)

(56) References Cited

U.S. PATENT DOCUMENTS

2013/0191643 A1 7/2013 Song et al.
2013/0329725 A1* 12/2013 Nakil ............... H04L 49/254
370/360
(Continued)

FOREIGN PATENT DOCUMENTS

| CN | 103200072 | 7/2013 |
| CN | 104580208 | 4/2015 |

(Continued)

OTHER PUBLICATIONS

International Search Report dated Feb. 1, 2016 in corresponding International Patent Application No. PCT/CN2015/078136.
(Continued)

*Primary Examiner* — Andrew J Steinle
*Assistant Examiner* — Sakinah White Taylor
(74) *Attorney, Agent, or Firm* — Kilpatrick Townsend & Stockton LLP

(57) ABSTRACT

The present invention discloses a software security verification method, a device, and a system, and relates to the communications field, so as to resolve a problem in the prior art that security verification on a VNF packet increases a VNF instantiation delay and reduces VNF instantiation performance. In a specific solution, after a first device receives an instantiation request of a VNF, the first device performs security verification on a stored VNF packet of the VNF when or after starting to instantiate the VNF according to the instantiation request of the VNF, and the first device sends first result information to a second device when security verification on the VNF packet of the VNF succeeds. The first result information includes information that security verification on the VNF packet of the VNF succeeds. The present invention is applied to software security verification.

14 Claims, 6 Drawing Sheets

(51) Int. Cl.
*H04L 12/24* (2006.01)
*H04L 12/40* (2006.01)

(58) Field of Classification Search
USPC .......................................................... 726/25
See application file for complete search history.

(56) References Cited

U.S. PATENT DOCUMENTS

| | | | | |
|---|---|---|---|---|
| 2014/0229945 A1* | 8/2014 | Barkai | ................... | H04L 49/70 718/1 |
| 2014/0241247 A1 | 8/2014 | Kempf et al. | | |
| 2014/0317261 A1* | 10/2014 | Shatzkamer | ............ | G06F 9/455 709/223 |
| 2014/0317293 A1* | 10/2014 | Shatzkamer | ............ | G06F 9/455 709/226 |
| 2014/0376555 A1 | 12/2014 | Choi et al. | | |
| 2015/0082308 A1 | 3/2015 | Kiess et al. | | |
| 2015/0180730 A1* | 6/2015 | Felstaine | ............... | H04L 41/022 709/225 |
| 2015/0288767 A1* | 10/2015 | Fargano | ............. | H04L 41/0896 709/227 |
| 2015/0333979 A1* | 11/2015 | Schwengler | ............ | H04L 67/10 709/226 |
| 2017/0244596 A1* | 8/2017 | Chen | ...................... | H04W 88/18 |
| 2017/0302646 A1 | 10/2017 | Wang et al. | | |
| 2018/0270111 A1 | 9/2018 | Oohira et al. | | |

FOREIGN PATENT DOCUMENTS

| | | |
|---|---|---|
| JP | 2013152717 A | 8/2013 |
| JP | 2015056182 A | 3/2015 |
| WO | WO2014110453 | 7/2014 |
| WO | 2016121882 A1 | 8/2016 |

OTHER PUBLICATIONS

ETSI GS NFV-SEC 003 V1.1.1 (Dec. 2014), *Network Functions Virtualisation (NFV); NFV Security; Security and Trust Guidance*, pp. 1-57.
International Search Report, dated Feb. 1, 2016, in International Application No. PCT/CN2015/078136 (4 pp.).
Written Opinion of the International Searching Authority, dated Feb. 1, 2016, in International Application No. PCT/CN2015/078136 (6 pp.).
ETSI GS NFV-SEC 001 V1.1.1 (Oct. 2014), "Network Functions Virtualisation (NFV); NFV Security; Problem Statement," (pp. 1-37).
ETSI GS NFV-MAN 001 V1.1.1 (Dec. 2014), "Network Functions Virtualisation (NFV); Management and Orchestration," pp. 1-184.
Notice of Allowance, dated Nov. 6, 2018, in Japanese Application No. 2017556567 (2 pp.).
"Network Functions Virtualisation (NFV); NFV Security; Problem Statement," ETSI GS NFV-SEC 001 V0.0.7, Nov. 2013, XP014160205, 40 pgs.
Basile et al., "A novel approach for integrating security policy enforcement with dynamic network virtualization," 2015 IEEE, XP32782095, 5 pgs.
"NFV certificate hierarchy," Huawei Technologies, NFV SEC, Apr. 2014, XP14202312, 2 pgs.
Yan et al., "A security and trust framework for virtualized networks and software-defined networking," Security and Communication Networks 2016, vol. 9, Mar. 26, 2015, XP055344988, pp. 3059-3069.
Extended European Search Report dated Apr. 12, 2018, in corresponding European Patent Application No. 15890358.3, 12 pgs.
Chinese Office Action dated Mar. 22, 2019 in corresponding Chinese Patent Application No. 201580042929.3 (7 pages).

* cited by examiner

SOFTWARE SECURITY VERIFICATION METHOD, DEVICE, AND SYSTEM

CROSS-REFERENCE TO RELATED APPLICATIONS

This application is a continuation of International Application No. PCT/CN2015/078136, filed on Apr. 30, 2015, the disclosure of which is hereby incorporated by reference in its entirety.

TECHNICAL FIELD

The present invention relates to the communications field, and in particular, to a software security verification method, a device, and a system.

BACKGROUND

During NFV (network function virtualization), a VNF (virtualized network function) is created on a common hardware device such as a server, a switch, or a memory to implement some network functions. In this way, these network functions can run on the common hardware device with no need of configuring a new dedicated network element device. This can greatly enhance network deployment flexibility and reduce investment costs.

In a process in which a network function is implemented by using an NFV technology, a VNF runs on hardware in a form of software, and a VNF resource is allocated and released by means of VNF instantiation and termination. The VNF instantiation is a process of allocating a resource to a VNF and installing software for the VNF. The termination is a process of releasing a resource allocated to a VNF. Generally, a resource required for VNF instantiation is stored in a VNF packet, and a VNF is instantiated according to the VNF packet.

In the prior art, to prevent a VNF packet from being forged and tampered in transmission and storage processes, a signature file of software is added to the VNF packet. After receiving the VNF packet, a receive end performs security verification on the VNF packet by verifying the signature file of the software, so as to ensure security of the VNF packet in a transmission process. In addition, the receive end further needs to perform security verification on the stored VNF packet before VNF instantiation is performed, so as to ensure security of the VNF packet during storage. However, this increases a VNF instantiation delay and reduces VNF instantiation performance.

SUMMARY

Embodiments of the present invention provide a software security verification method, a device, and a system, so as to resolve a problem in the prior art that security verification on a VNF packet increases a VNF instantiation delay and reduces VNF instantiation performance.

To achieve the foregoing objective, the following technical solutions are used in the embodiments of the present invention:

According to a first aspect, an embodiment of the present invention provides a software security verification method, where after a first device receives an instantiation request of a virtualized network function VNF, the method includes:
performing, by the first device, security verification on a stored VNF packet of the VNF when or after starting to instantiate the VNF according to the instantiation request of the VNF; and
sending, by the first device, the first result information to a second device when security verification on the VNF packet of the VNF succeeds, so that the second device connects a virtual machine VM to a network after determining, according to the first result information, that security verification on the VNF packet of the VNF succeeds, where the VM is a VM created for the VNF by the second device, and the first result information includes information that security verification on the VNF packet of the VNF succeeds.

With reference to the first aspect, in a first possible implementation of the first aspect, the method further includes:
when security verification on the VNF packet of the VNF fails, terminating, by the first device, VNF instantiation, or sending, by the first device, first result information to a second device, where the first result information includes information that security verification on the VNF packet of the VNF fails.

With reference to either the first aspect or the first possible implementation of the first aspect, in a second possible implementation of the first aspect, the VNF packet of the VNF includes a software image of the VNF; and
the performing, by the first device, security verification on a stored VNF packet of the VNF includes:
performing, by the first device, security verification on the software image of the VNF.

With reference to either the first aspect or the first possible implementation of the first aspect, in a third possible implementation of the first aspect, the VNF packet of the VNF does not include a software image of the VNF; and the method further includes:
sending, by the first device, first instruction information to the second device, where the first instruction information is used to instruct the second device to perform security verification on the software image of the VNF, and the software image of the VNF has been stored in the second device.

With reference to the third possible implementation of the first aspect, in a fourth possible implementation of the first aspect, the sending, by the first device, first instruction information to the second device includes:
sending, by the first device, a second instruction message to the second device, where the second instruction message is used to instruct the second device to allocate a resource to the VNF and establish a connection for the VNF, the first instruction information is included in the second instruction message.

With reference to the third possible implementation of the first aspect, in a fifth possible implementation of the first aspect, the sending, by the first device, first instruction information to the second device includes:
sending, by the first device, a third instruction message to the second device, where the third instruction message is used to instruct the second device to perform resource availability check on the VNF, the first instruction information is included in the third instruction message.

With reference to any one of the third possible implementation of the first aspect to the fifth possible implementation of the first aspect, in a sixth possible implementation of the first aspect, the method further includes:
receiving, by the first device, second result information sent by the second device, where the second result information includes a result of performing security verification on the software image of the VNF by the second device.

With reference to any one of the first aspect or the first to the sixth possible implementations of the first aspect, in a seventh possible implementation of the first aspect, the first device is a network functions virtualization orchestrator NFVO, and the second device is a virtualized infrastructure manager VIM.

According to a second aspect, an embodiment of the present invention provides a software security verification method, including:

determining, by a second device, a security verification result of a VNF packet of a VNF; and connecting, by the second device, a virtual machine VM to a network when the second device determines that security verification on the VNF packet of the VNF succeeds, where the VM is a VM created for the virtualized network function VNF by the second device.

With reference to the second aspect, in a first possible implementation of the second aspect, the method further includes:

terminating, by the second device, VNF instantiation when the second device determines that security verification on the VNF packet of the VNF fails, where VNF instantiation includes connecting the VM to the network.

With reference to either the second aspect or the first possible implementation of the second aspect, in a second possible implementation of the second aspect, the determining, by a second device, a security verification result of a VNF packet of a VNF includes:

receiving, by the second device, first result information sent by a first device, where the first result information includes the security verification result of the VNF packet of the VNF; and determining, by the second device, the security verification result of the VNF packet of the VNF according to the first result information.

With reference to either the second aspect or the first possible implementation of the second aspect, in a third possible implementation of the second aspect, the VNF packet of the VNF does not include a software image of the VNF, and the software image of the VNF is stored in the second device; and the method further includes:

receiving, by the second device, first instruction information sent by the first device, where the first instruction information is used to instruct the second device to perform security verification on the software image of the VNF; and performing, by the second device, security verification on the software image of the VNF according to the first instruction information, and determining a security verification result of the software image of the VNF; and the connecting, by the second device, the VM to a network when the second device determines that security verification on the VNF packet of the VNF succeeds includes:

connecting, by the second device, the VM to the network when the second device determines that security verification on the VNF packet of the VNF and the software image of the VNF succeeds.

With reference to the third possible implementation of the second aspect, in a fourth possible implementation of the second aspect, the performing, by the second device, security verification on the software image of the VNF according to the first instruction information includes:

performing, by the second device, security verification on the software image of the VNF according to the first instruction information at the same time of creating the VM for the VNF and connecting the VM to the network.

With reference to the third possible implementation of the second aspect, in a fifth possible implementation of the second aspect, the receiving, by the second device, first instruction information sent by the first device includes:

receiving, by the second device, a second instruction message sent by the first device, where the second instruction message is used to instruct the second device to allocate a resource to the VNF and establish a connection for the VNF, the first instruction information is included in the second instruction message.

With reference to the third possible implementation of the second aspect, in a sixth possible implementation of the second aspect, the receiving, by the second device, first instruction information sent by the first device includes:

receiving, by the second device, a third instruction message sent by the first device, where the third instruction message is used to instruct the second device to perform resource availability check on the VNF, the first instruction information is included in the third instruction message.

With reference to any one of the third possible implementation of the second aspect to the sixth possible implementation of the second aspect, in a seventh possible implementation of the second aspect, after the performing, by the second device, security verification on the software image of the VNF according to the first instruction information, the method further includes:

sending, by the second device, second result information to the first device, where the second result information includes the result of performing security verification on the software image of the VNF by the second device.

With reference to any one of the second aspect or the first to the seventh possible implementations of the second aspect, in an eighth possible implementation of the second aspect, the first device is a network functions virtualization orchestrator NFVO, and the second device is a virtualized infrastructure manager VIM.

According to a third aspect, an embodiment of the present invention provides a first device, including:

a security verification unit, configured to: after the first device receives an instantiation request of a virtualized network function VNF and when or after the first device starts to instantiate the VNF according to the instantiation request of the VNF, perform security verification on a stored VNF packet of the VNF; and a sending unit, configured to send the first result information to a second device when a verification result of the security verification unit indicates that security verification on the VNF packet of the VNF succeeds, so that the second device connects a virtual machine VM to a network after determining, according to the first result information, that security verification on the VNF packet of the VNF succeeds, where the VM is a VM created for the VNF by the second device, and the first result information includes information that security verification on the VNF packet of the VNF succeeds.

With reference to the third aspect, in a first possible implementation of the third aspect, the first device further includes a termination unit, configured to terminate VNF instantiation when security verification on the VNF packet of the VNF fails; or the sending unit is further configured to send first result information to a second device when security verification on the VNF packet of the VNF fails, where the first result information includes information that security verification on the VNF packet of the VNF fails.

With reference to either the third aspect or the first possible implementation of the third aspect, in a second possible implementation of the third aspect, the VNF packet of the VNF includes a software image of the VNF; and the security verification unit is further configured to perform security verification on the software image of the VNF.

With reference to either the third aspect or the first possible implementation of the third aspect, in a third possible implementation of the third aspect, the VNF packet of the VNF does not include a software image of the VNF; and the sending unit is further configured to send first instruction information to the second device, where the first instruction information is used to instruct the second device to perform security verification on the software image of the VNF, and the software image of the VNF has been stored in the second device.

With reference to the third possible implementation of the third aspect, in a fourth possible implementation of the third aspect, the sending unit is further configured to send a second instruction message to the second device, where the second instruction message is used to instruct the second device to allocate a resource to the VNF and establish a connection for the VNF, the first instruction information is included in the second instruction message.

With reference to the third possible implementation of the third aspect, in a fifth possible implementation of the third aspect, the sending unit is further configured to send a third instruction message to the second device, where the third instruction message is used to instruct the second device to perform resource availability check on the VNF, the first instruction information is included in the third instruction message.

With reference to any one of the third possible implementation of the third aspect to the fifth possible implementation of the third aspect, in a sixth possible implementation of the third aspect, the first device further includes a receiving unit, configured to receive second result information sent by the second device, where the second result information includes a result of performing security verification on the software image of the VNF by the second device.

With reference to any one of the third aspect or the first to the sixth possible implementations of the third aspect, in a seventh possible implementation of the third aspect, the first device is a network functions virtualization orchestrator NFVO, and the second device is a virtualized infrastructure manager VIM.

According to a fourth aspect, an embodiment of the present invention provides a second device, including:

a security verification unit, configured to determine a security verification result of a VNF packet of a VNF; and a resource management unit, configured to connect a virtual machine VM to a network when the security verification unit determines that security verification on the VNF packet of the VNF succeeds, where the VM is a VM created for the virtualized network function VNF by the second device.

With reference to the fourth aspect, in a first possible implementation of the fourth aspect, the second device further includes a termination unit, configured to terminate VNF instantiation when the security verification unit determines that security verification on the VNF packet of the VNF fails, where VNF instantiation includes connecting the VM to the network.

With reference to either the fourth aspect or the first possible implementation of the fourth aspect, in a second possible implementation of the fourth aspect, the second device further includes a receiving unit, configured to receive first result information sent by a first device, where the first result information includes the security verification result of the VNF packet of the VNF; and the security verification unit is further configured to determine the security verification result of the VNF packet of the VNF according to the first result information received by the receiving unit.

With reference to either the fourth aspect or the first possible implementation of the fourth aspect, in a third possible implementation of the fourth aspect, the VNF packet of the VNF does not include a software image of the VNF, and the software image of the VNF is stored in the second device;

the second device further includes a receiving unit, configured to receive first instruction information sent by the first device, where the first instruction information is used to instruct the second device to perform security verification on the software image of the VNF;

the security verification unit is further configured to: perform security verification on the software image of the VNF according to the first instruction information received by the receiving unit, and determine a security verification result of the software image of the VNF; and the resource management unit is further configured to connect the VM to the network when the security verification unit determines that security verification on the VNF packet of the VNF and the software image of the VNF succeeds.

With reference to the third possible implementation of the fourth aspect, in a fourth possible implementation of the fourth aspect, the security verification unit is further configured to perform security verification on the software image of the VNF according to the first instruction information at the same time when the second device creates the VM for the VNF and connects the VM to the network.

With reference to the third possible implementation of the fourth aspect, in a fifth possible implementation of the fourth aspect, the receiving unit is further configured to receive a second instruction message sent by the first device, where the second instruction message is used to instruct the second device to allocate a resource to the VNF and establish a connection for the VNF, the first instruction information is included in the second instruction message.

With reference to the third possible implementation of the fourth aspect, in a sixth possible implementation of the fourth aspect, the receiving unit is further configured to receive a third instruction message sent by the first device, where the third instruction message is used to instruct the second device to perform resource availability check on the VNF, the first instruction information is included in the third instruction message.

With reference to any one of the third possible implementation of the fourth aspect to the sixth possible implementation of the fourth aspect, in a seventh possible implementation of the fourth aspect, the second device further includes a sending unit, configured to send second result information to the first device, where the second result information includes the result of performing security verification on the software image of the VNF by the second device.

With reference to any one of the fourth aspect or the first to the seventh possible implementations of the fourth aspect, in an eighth possible implementation of the fourth aspect, the first device is a network functions virtualization orchestrator NFVO, and the second device is a virtualized infrastructure manager VIM.

According to a fifth aspect, an embodiment of the present invention provides a first device, including a processor, a memory, a bus, and a transmitter, where the processor, the memory, and the transmitter are connected to each other by using the bus;

the processor is configured to: after the first device receives an instantiation request of a virtualized network function VNF and when or after the first device starts to instantiate the VNF according to the instantiation request of the VNF, perform security verification on a stored VNF packet of the VNF; and the transmitter is configured to send the first result information to a second device when a verification result of the processor indicates that security verification on the VNF packet of the VNF succeeds, so that the second device connects a virtual machine VM to a network after determining, according to the first result information, that security verification on the VNF packet of the VNF succeeds, where the VM is a VM created for the VNF by the second device, and the first result information includes information that security verification on the VNF packet of the VNF succeeds.

With reference to the fifth aspect, in a first possible implementation of the fifth aspect, the processor is further configured to terminate VNF instantiation when security verification on the VNF packet of the VNF fails; or the transmitter is further configured to send first result information to a second device when security verification on the VNF packet of the VNF fails, where the first result information includes information that security verification on the VNF packet of the VNF fails.

With reference to either the fifth aspect or the first possible implementation of the fifth aspect, in a second possible implementation of the fifth aspect, the VNF packet of the VNF includes a software image of the VNF; and the processor is further configured to perform security verification on the software image of the VNF.

With reference to either the fifth aspect or the first possible implementation of the fifth aspect, in a third possible implementation of the fifth aspect, the VNF packet of the VNF does not include a software image of the VNF; and the transmitter is further configured to send first instruction information to the second device, where the first instruction information is used to instruct the second device to perform security verification on the software image of the VNF, and the software image of the VNF has been stored in the second device.

With reference to the third possible implementation of the fifth aspect, in a fourth possible implementation of the fifth aspect, the transmitter is further configured to send a second instruction message to the second device, where the second instruction message is used to instruct the second device to allocate a resource to the VNF and establish a connection for the VNF, the first instruction information is included in the second instruction message.

With reference to the third possible implementation of the fifth aspect, in a fifth possible implementation of the fifth aspect, the transmitter is further configured to send a third instruction message to the second device, where the third instruction message is used to instruct the second device to perform resource availability check on the VNF, the first instruction information is included in the third instruction message.

With reference to any one of the third possible implementation of the fifth aspect to the fifth possible implementation of the fifth aspect, in a sixth possible implementation of the fifth aspect, the first device further includes a receiver, configured to receive second result information sent by the second device, where the second result information includes a result of performing security verification on the software image of the VNF by the second device.

With reference to any one of the fifth aspect or the first to the sixth possible implementations of the fifth aspect, in a seventh possible implementation of the fifth aspect, the first device is a network functions virtualization orchestrator NFVO, and the second device is a virtualized infrastructure manager VIM.

According to a sixth aspect, an embodiment of the present invention provides a second device, including a processor, a memory, and a bus, where the processor and the memory are connected to each other by using the bus; and the processor is configured to: determine a security verification result of a VNF packet of a VNF; and connect a virtual machine VM to a network when determining that security verification on the VNF packet of the VNF succeeds, where the VM is a VM created for the virtualized network function VNF by the second device.

With reference to the sixth aspect, in a first possible implementation of the sixth aspect, the processor is further configured to terminate VNF instantiation when determining that security verification on the VNF packet of the VNF fails, where VNF instantiation includes connecting the VM to the network.

With reference to either the sixth aspect or the first possible implementation of the sixth aspect, in a second possible implementation of the sixth aspect, the second device further includes a receiver, configured to receive first result information sent by a first device, where the first result information includes the security verification result of the VNF packet of the VNF; and the processor is further configured to determine the security verification result of the VNF packet of the VNF according to the first result information received by the receiver.

With reference to either the sixth aspect or the first possible implementation of the sixth aspect, in a third possible implementation of the sixth aspect, the VNF packet of the VNF does not include a software image of the VNF, and the software image of the VNF is stored in the second device;

the second device further includes a receiver, configured to receive first instruction information sent by the first device, where the first instruction information is used to instruct the second device to perform security verification on the software image of the VNF; and the processor is further configured to: perform security verification on the software image of the VNF according to the first instruction information received by the receiver, and determine a security verification result of the software image of the VNF; and connect the VM to the network when determining that security verification on the VNF packet of the VNF and the software image of the VNF succeeds.

With reference to the third possible implementation of the sixth aspect, in a fourth possible implementation of the sixth aspect, the processor is further configured to perform security verification on the software image of the VNF according to the first instruction information at the same time when the second device creates the VM for the VNF and connects the VM to the network.

With reference to the third possible implementation of the sixth aspect, in a fifth possible implementation of the sixth aspect, the receiver is further configured to receive a second instruction message sent by the first device, where the second instruction message is used to instruct the second device to allocate a resource to the VNF and establish a connection for the VNF, the first instruction information is included in the second instruction message.

With reference to the third possible implementation of the sixth aspect, in a sixth possible implementation of the sixth aspect, the receiver is further configured to receive a third instruction message sent by the first device, where the third instruction message is used to instruct the second device to perform resource availability check on the VNF, the first instruction information is included in the third instruction message.

With reference to any one of the third possible implementation of the sixth aspect to the sixth possible implementation of the sixth aspect, in a seventh possible implementation of the sixth aspect, the second device further includes a transmitter, configured to send second result information to the first device, where the second result information includes the result of performing security verification on the software image of the VNF by the second device.

With reference to any one of the sixth aspect or the first to the seventh possible implementations of the sixth aspect, in an eighth possible implementation of the sixth aspect, the first device is a network functions virtualization orchestrator NFVO, and the second device is a virtualized infrastructure manager VIM.

According to the software security verification method and the device that are provided in the embodiments of the present invention, after a first device receives an instantiation request of a VNF and before a second device connects a VM to a network, the first device performs security verification on a stored VNF packet of the VNF when or after starting to instantiate the VNF according to the instantiation request of the VNF, and the first device sends first result information to the second device when security verification on the VNF packet of the VNF succeeds. The first result information includes information that security verification on the VNF packet of the VNF succeeds. Security verification is performed on the VNF packet of the VNF at the same time of executing a procedure of instantiating the VNF. Therefore, compared with the prior art in which security verification is performed on a VNF packet of a VNF before instantiation, in the present invention, time is reduced, a VNF instantiation delay is reduced, and VNF instantiation performance is improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
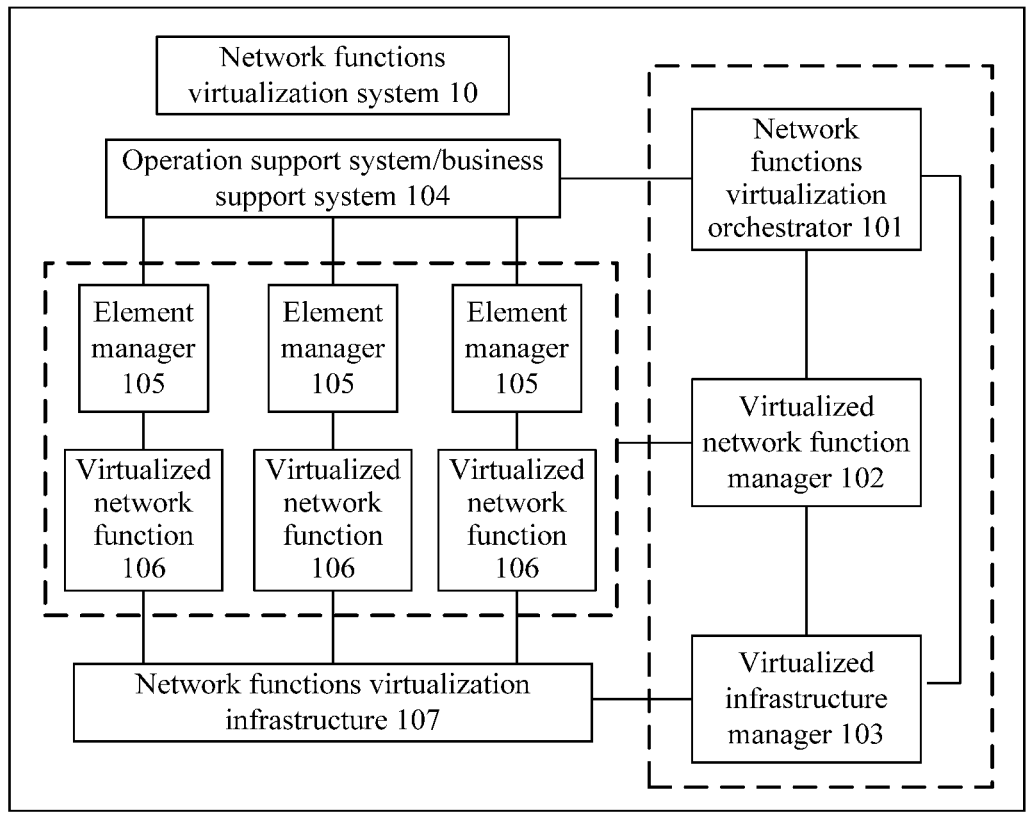
FIG. 1 is a schematic structural diagram of a network functions virtualization system according to an embodiment of the present invention.

An embodiment of the present invention provides a network functions virtualization system. Referring to FIG. 1, the network functions virtualization system 10 includes an NFVO (Network Functions Virtualization Orchestrator, network functions virtualization orchestrator) 101, a VNFM (virtualized network function manager) 102, a VIM (virtualized infrastructure manager) 103, an OSS/BSS (operation support system/business support system) 104, an EM (Element Management, element manager) 105, a VNF (Virtualised Network Function, virtualized network function) 106, and an NFVI (Network Function Virtualization Infrastructure, network functions virtualization infrastructure) 107.

The NFVO 101 is configured to: perform network side orchestration and management on an infrastructure resource and a software resource of an NFV, and implement an NFV service topology on the NFVI 107.

The VNFM 102 is configured to manage a life cycle of a VNF instance.

The VIM 103 is configured to control and manage a network resource and a virtualized entity that are used for calculation and storage.

The OSS/BSS 104 is configured to perform network management, system management, provide charging, accounting, and customer services, or the like.

The EM 105 manages a network unit.

The VNF 106 is corresponding to a PNF (Physical network function, physical network function) in a conventional non-virtualized network, for example, a virtualized EPC (Evolved Packet Core) node, and implements a particular network function. The VNF may include multiple lower-level components. Therefore, one VNF may be deployed on multiple VMs, and each VM controls a VNF component.

The NFVI 107 includes a hardware resource, a virtual resource, and a virtual layer, and is an entity that provides a required virtual resource.

It should be understood that the VNF in the present invention may be a VNF, or may be a part of a VNF, for example, a VNFC (virtualized network function component). This is not limited in the present invention. The VNF is used only to represent one VNF or one VNFC of one VNF, or multiple VNFCs of one VNF. This does not intend to be construed as a limitation.

Figure 2:
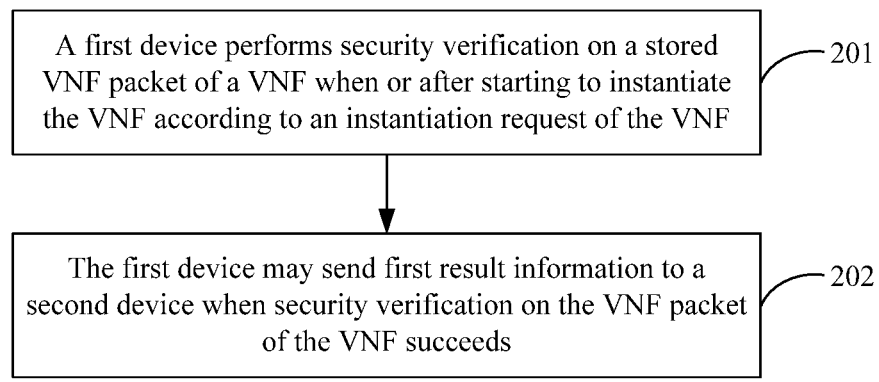
FIG. 2 is a schematic flowchart of a software security verification method according to an embodiment of the present invention.

An embodiment of the present invention provides a software security verification method that is applied to a first device. Optionally, the software security verification method provided in this embodiment may be implemented in the network functions virtualization system shown in FIG. 1. Referring to FIG. 2, after the first device receives an instantiation request of a VNF (virtualized network function) and before a second device connects a VM (virtual machine) to a network, the software security verification method provided in this embodiment includes the following steps, where the VM is a VM created for the first virtualized network function VNF by the second device.

201. The first device performs security verification on a stored VNF packet of the VNF when or after starting to instantiate the VNF according to the instantiation request of the VNF.

It should be noted that a procedure of instantiating the VNF includes the following steps: S1. Verify and confirm the instantiation request of the VNF. S2. Perform instantiation feasibility check. S3. Allocate a resource to the VNF and establish a connection for the VNF. S4. Terminate instantiation. Certainly, this is only used as an example to describe main steps of VNF instantiation, but this does not mean that the present invention is limited thereto. Step S2 may be performed, or may not be performed. In the procedure of instantiating the VNF, an operation of performing security verification on a VNF packet of the VNF is performed synchronously. In this case, an instantiation time is reduced. The first device may start to perform security verification on the VNF packet of the VNF in any step in the procedure of instantiating the VNF. Certainly, to reduce time, it is better to start to perform security verification as early as possible. An optimal solution is to start to perform verification on the VNF packet of the VNF after the first device receives the instantiation request of the VNF.

Optionally, the VNF packet of the VNF may include or may not include a software image of the VNF. Certainly, a method for performing security verification on the VNF packet of the VNF is not limited in the present invention.

Optionally, in an application scenario, when the VNF packet of the VNF includes a software image of the VNF, the performing, by the first device, security verification on a stored VNF packet of the VNF includes: performing, by the first device, security verification on the software image of the VNF.

Alternatively, optionally, in another application scenario, when the VNF packet of the VNF does not include a software image of the VNF, if security verification on the VNF packet of the VNF succeeds, the first device sends first instruction information to the second device. The first instruction information is used to instruct the second device to perform security verification on the software image of the VNF, and the software image of the VNF has been stored in the second device.

In this case, in the corresponding procedure of instantiating the VNF, optionally, the first device may send a second instruction message to the second device. The second instruction message is used to instruct the second device to allocate a resource to the VNF and establish a connection for the VNF, the first instruction information is included in the second instruction message. Alternatively, optionally, the first device sends a third instruction message to the second device. The third instruction message is used to instruct the second device to perform resource availability check on the VNF, the first instruction information is included in the third instruction message.

Optionally, if the first device has sent the first instruction information to the second device, the first device may further receive second result information sent by the second device. The second result information includes a result of performing security verification on the software image of the VNF by the second device.

202. The first device may send first result information to the second device when security verification on the VNF packet of the VNF succeeds.

The first result information includes information that security verification on the VNF packet of the VNF succeeds. The first device sends the first result information to the second device, so that the second device connects a virtual machine VM to a network after determining, according to the first result information, that security verification on the VNF packet of the VNF succeeds. The VM is a VM created for the VNF by the second device.

Preferably, the first device may be the NFVO 101 in the network functions virtualization system 10 shown in FIG. 1. The second device may be the VIM 103 in the network functions virtualization system 10 shown in FIG. 1. Certainly, this is only used as an example for description, but this does not mean that the present invention is limited thereto.

Optionally, when security verification on the VNF packet of the VNF fails, the first device terminates VNF instantiation, or the first device sends first result information to the second device. The first result information includes information that security verification on the VNF packet of the VNF fails.

According to the software security verification method provided in this embodiment of the present invention, after a first device receives an instantiation request of a VNF and before a second device connects a VM to a network, the first device performs security verification on a stored VNF packet of the VNF when or after starting to instantiate the VNF according to the instantiation request of the VNF, and the first device sends first result information to the second device when security verification on the VNF packet of the VNF succeeds. The first result information includes information that security verification on the VNF packet of the VNF succeeds. Security verification is performed on the VNF packet of the VNF at the same time of executing a procedure of instantiating the VNF. Therefore, compared with the prior art in which security verification is performed on a VNF packet of a VNF before instantiation, in the present invention, time is reduced, a VNF instantiation delay is reduced, and VNF instantiation performance is improved.

Figure 3:
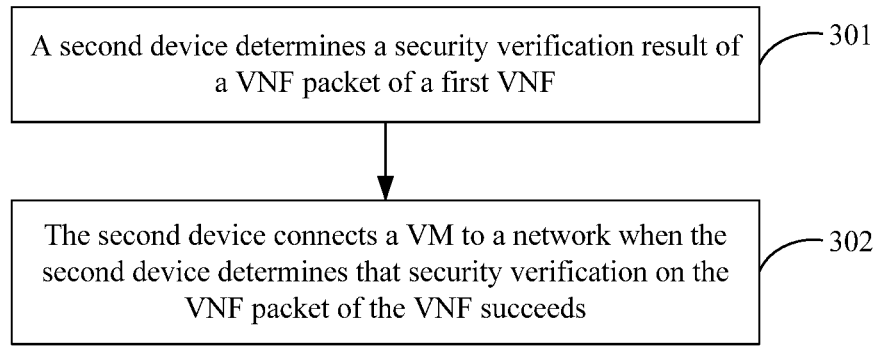
FIG. 3 is a schematic flowchart of another software security verification method according to an embodiment of the present invention.

An embodiment of the present invention provides another software security verification method that is applied to a second device. Optionally, the software security verification method provided in this embodiment may be implemented in the network functions virtualization system shown in FIG. 1. Referring to FIG. 3, before the second device connects a VM to a network, the software security verification method provided in this embodiment includes the following steps, where the VM is a VM created for the first virtualized network function VNF by the second device.

301. The second device determines a security verification result of a VNF packet of a VNF.

Optionally, with reference to the description in step 201 in the embodiment corresponding to FIG. 2, when a first device performs security verification on the VNF packet of the VNF, the VNF packet of the VNF may include or may not include a software image of the VNF.

Optionally, in an application scenario, the VNF packet of the VNF includes a software image of the VNF. The second device may receive first result information sent by the first device. Because the VNF packet includes the software image of the VNF, the first result information includes a security verification result of the software image of the VNF. In this case, the second device determines the security verification result of the VNF packet of the VNF according to the first result information.

Alternatively, optionally, in another application scenario, the VNF packet of the VNF does not include a software image of the VNF. The software image of the VNF is stored in the second device. The second device may receive first instruction information sent by the first device. The first instruction information is used to instruct the second device to perform security verification on the software image of the VNF. The second device performs security verification on the software image of the VNF according to the first instruction information, determines a security verification result of the software image of the VNF, and determines the security verification result of the VNF packet of the VNF according to first result information.

In this case, in the corresponding procedure of instantiating the VNF, optionally, the second device receives a second instruction message sent by the first device. The second instruction message is used to instruct the second device to allocate a resource to the VNF and establish a connection for the VNF, the first instruction information is included in the second instruction message. Alternatively, optionally, the second device receives a third instruction message sent by the first device. The third instruction message is used to instruct the second device to perform resource availability check on the VNF, the first instruction information is included in the third instruction message.

302. The second device connects the VM to the network when the second device determines that security verification on the VNF packet of the VNF succeeds.

Preferably, with reference to the description in step 301, when the VNF packet of the VNF does not include the software image of the VNF, the second device connects the VM to the network when determining that security verification on the VNF packet of the VNF and the software image of the VNF succeeds.

Optionally, the second device terminates VNF instantiation when the second device determines that security verification on the VNF packet of the VNF fails. VNF instantiation includes connecting the VM to the network. Further, optionally, when the VNF packet of the VNF does not include the software image of the VNF, VNF instantiation is terminated if the second device determines that security verification on the VNF packet of the VNF or the software image of the VNF fails.

Optionally, the second device may further send second result information to the first device. The second result information includes the result of performing security verification on the software image of the VNF by the second device.

Herein, it should be noted that in a preferable application scenario, the second device can connect the VM to the network only when determining that security verification on both the VNF packet of the VNF and the software image of the VNF succeeds. If security verification on the VNF packet of the VNF or the software image of the VNF fails, it is proved that the VNF packet of the VNF or the software image of the VNF is tampered unauthorizedly; in this case, a threat is posed to network security if the network is connected. Therefore, a security verification result of the VNF packet of the VNF and the software image of the VNF needs to be determined before the VM is connected to the network. Herein, connecting the VM to the network specifically means connecting the VM to an internal network of the VNF.

Preferably, the first device may be the NFVO 101 in the network functions virtualization system 10 shown in FIG. 1. The second device may be the VIM 103 in the network functions virtualization system 10 shown in FIG. 1. Certainly, this is only used as an example for description, but this does not mean that the present invention is limited thereto.

According to the software security verification method provided in this embodiment of the present invention, after a first device receives an instantiation request of a VNF and before a second device connects a VM to a network, the second device determines a security verification result of a VNF packet of the VNF. When the second device determines that security verification on the VNF packet of the VNF succeeds, the second device connects the VM to the network. Security verification is performed on the VNF packet of the VNF at the same time of executing a procedure of instantiating the VNF. Therefore, compared with the prior art in which security verification is performed on a VNF packet of a VNF before instantiation, in the present invention, time is reduced, a VNF instantiation delay is reduced, and VNF instantiation performance is improved.

Figure 4:
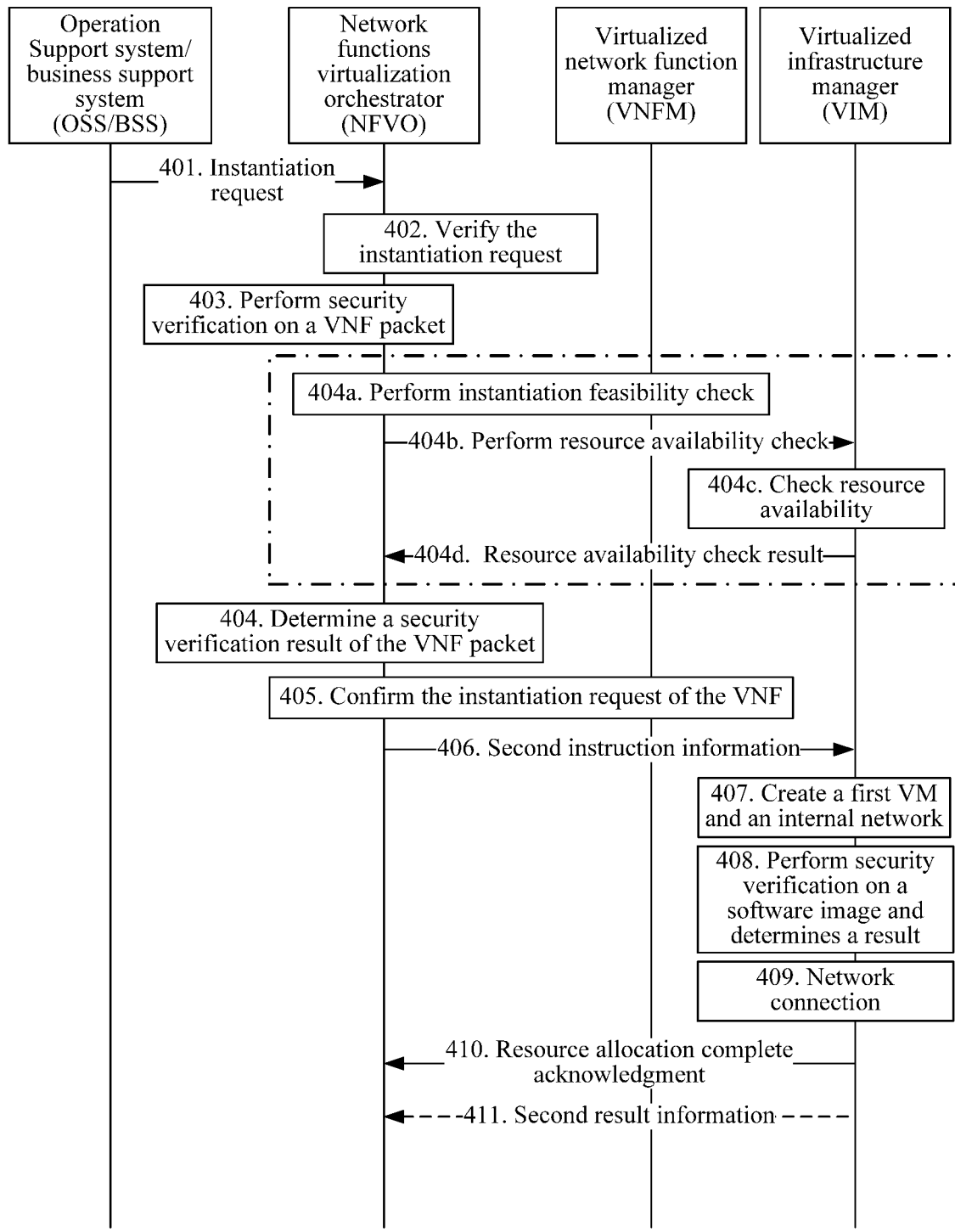
FIG. 4 is a schematic flowchart of a software security verification method according to another embodiment of the present invention.

Based on the embodiment corresponding to FIG. 2 and the embodiment corresponding to FIG. 3, another embodiment of the present invention provides a software security verification method that is applied to the network functions virtualization system 10 shown in FIG. 1. An example in which a first device is the NFVO 101 in FIG. 1 and a second device is the VIM 103 in FIG. 1 is used for description in the present invention. In this embodiment, a VNF packet, stored in the first device, of a VNF does not include a software image of the VNF, and the software image of the VNF is stored in the second device. Certainly, this embodiment is only used as an example for description, but this does not mean that the present invention is limited thereto. Referring to FIG. 4, the method includes the following steps.

401. The NFVO receives an instantiation request of the VNF.

The instantiation request of the VNF is sent to the NFVO (the first device) by an OSS.

402. The NFVO verifies the instantiation request of the VNF.

The NFVO verifies validity of the instantiation request of the VNF, and performs step 405 when determining that the instantiation request of the VNF is valid.

403. The NFVO performs security verification on the VNF packet of the VNF.

404. The NFVO determines a security verification result of the VNF packet of the VNF.

405. The NFVO determines to instantiate the VNF.

Optionally, the NFVO may further send the instantiation request of the VNF to a VNFM, and the VNFM verifies the instantiation request of the VNF and performs instantiation processing, including modifying/supplementing instantiation input data in a VNFD (virtualized network function descriptor) and a specific parameter of a life cycle of the VNF.

Optionally, step 404a to step 404d may be further included between step 403 and step 405.

404a. Perform instantiation feasibility check between the NFVO and a VNFM.

404b. The NFVO sends a resource availability check instruction to a VIM.

Optionally, when step 404a to step 404d are performed, first instruction information and the resource availability check instruction may be sent to the VIM at the same time. The first instruction information is used to instruct the second device to perform security verification on the software image of the VNF.

404c. The VIM checks resource availability.

404d. The VIM sends a resource availability check result to the NFVO.

It should be noted that step 403 and step 405 are performed synchronously. When the NFVO determines that security verification on the VNF packet of the VNF succeeds, after step 403 and step 405 are performed, the method further includes the following steps.

406. The NFVO sends a second instruction message to the VIM.

The second instruction message is used to instruct the second device to allocate a resource to the VNF and establishes a connection for the VNF. If step 404b is not performed or no first instruction information is sent in step 404b, the first instruction information may be included in the second instruction message. Optionally, first result information and the second instruction message may be sent to the VIM at the same time. The first result information is used to indicate a security verification result of the VNF packet of the VNF. Certainly, herein, security verification on the VNF packet of the VNF succeeds. Optionally, the first result information alone may be sent to the VIM by the NFVO after step 407.

407. The VIM creates a VM and an internal network.

The VM is a VM created for a VNF instance by the VIM. The internal network is a network, formed by connecting VNFCs, in the VNF. It should be noted that there are multiple VMs. This is not limited in the present invention.

408. The VIM performs security verification on a software image of the VNF and determines a verification result. There is no sequential order between step 407 and step 408.

Optionally, step 408 is performed after the VIM receives the first instruction information. If the first instruction information is sent to the VIM in step 404b, the VIM may perform security verification on the software image of the VNF after step 404b; if the first instruction information is sent to the VIM in step 406, the VIM may perform security verification on the software image of the VNF after step 406.

When the VIM determines that security verification on the software image of the VNF succeeds, the method further includes the following steps.

409. The VIM connects the VM to the network.

Connecting the VM to the network is connecting the VM to the internal network of the VNF.

410. The VIM sends a resource allocation complete acknowledgment to the NFVO.

Optionally, the resource allocation complete acknowledgment may be sent to the NFVO together with second result information. The second result information includes the result of performing security verification on the software image of the VNF by the second device. Herein, security verification on the software image of the VNF succeeds.

When the VIM determines that security verification on the software image of the VNF fails, the method further includes the following step.

411. The VIM sends second result information to the NFVO.

Herein, the second result information indicates that the second device fails in performing security verification on the software image of the VNF.

According to the software security verification method provided in this embodiment of the present invention, after a first device receives an instantiation request of a VNF and before a second device connects a VM to a network, the first device performs security verification on a stored VNF packet of the VNF when or after starting to instantiate the VNF according to the instantiation request of the VNF, and the first device sends first result information to the second device when security verification on the VNF packet of the VNF succeeds. The first result information includes information that security verification on the VNF packet of the VNF succeeds. Security verification is performed on the VNF packet of the VNF at the same time of executing a procedure of instantiating the VNF. Therefore, compared with the prior art in which security verification is performed on a VNF packet of a VNF before instantiation, in the present invention, time is reduced, a VNF instantiation delay is reduced, and VNF instantiation performance is improved.

Figure 5:
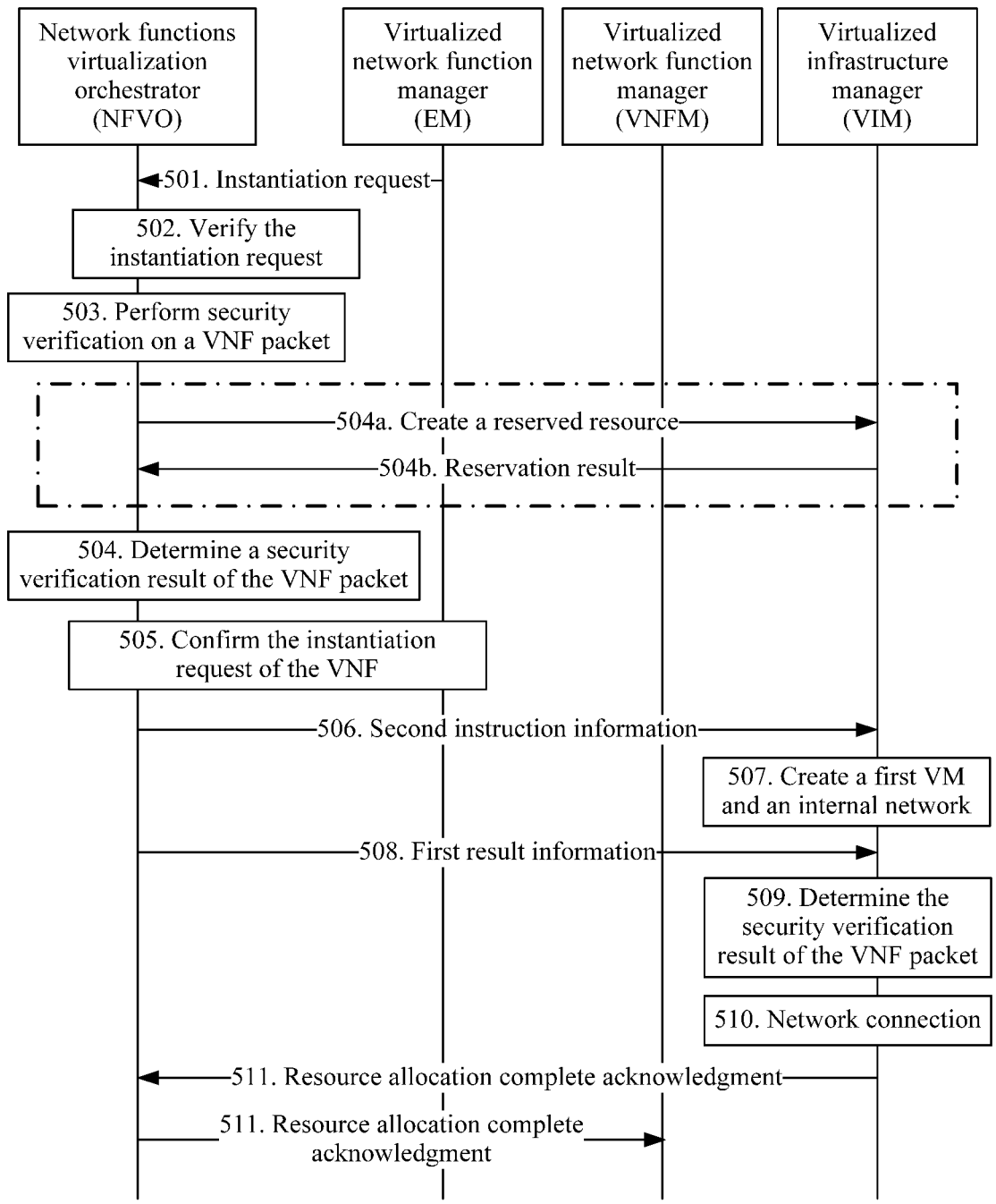
FIG. 5 is a schematic flowchart of a software security verification method according to still another embodiment of the present invention.

Based on the embodiment corresponding to FIG. 2 and the embodiment corresponding to FIG. 3, still another embodiment of the present invention provides a software security verification method that is applied to the network functions virtualization system 10 shown in FIG. 1. An example in which a first device is the NFVO 101 in FIG. 1 and a second device is the VIM 103 in FIG. 1 is used for description in the present invention. In this embodiment, a VNF packet, stored in the first device, of a VNF includes a software image of the VNF. Certainly, this embodiment is only used as an example for description, but this does not mean that the present invention is limited thereto. Referring to FIG. 5, the method includes the following steps.

501. The NFVO receives an instantiation request of the VNF.

The instantiation request of the VNF is sent to the NFVO (the first device) by an EM.

502. The NFVO verifies the instantiation request of the VNF.

The NFVO verifies validity of the instantiation request of the VNF, and performs step 503 when determining that the instantiation request of the VNF is valid.

503. The NFVO performs security verification on the VNF packet of the VNF.

Herein, it should be noted that the VNF packet, stored in the NFVO, of the VNF includes the software image of the VNF. The performing, by the NFVO, security verification on the VNF packet of the VNF includes performing security verification on the software image of the VNF.

504. The NFVO determines a security verification result of the VNF packet of the VNF.

505. The NFVO determines to instantiate the VNF.

Optionally, the NFVO may further send the instantiation request of the VNF to a VNFM, and the VNFM verifies the instantiation request of the VNF and performs processing, including modifying/supplementing instantiation input data in a VNFD and a specific parameter of a life cycle of the VNF.

Optionally, step 504a and step 504b may be further included between step 503 and step 505.

504a. Create resource reservation, request the VIM to check an available resource for a newly-instantiated VNF, and reserve the available resource.

504b. The VIM sends a reservation result to the NFVO.

506. The NFVO sends a second instruction message to the VIM.

The second instruction message is used to instruct the second device to allocate a resource to the VNF and establishes a connection for the VNF.

507. The VIM creates a VM and an internal network.

The VM is a VM created for a VNF instance by the VIM. The internal network is a network, formed by connecting VNFCs, in the VNF. It should be noted that there may be multiple VMs. This is not limited in the present invention.

It should be noted that step 503 and step 505 are performed synchronously, and after step 503 is performed, the method further includes the following steps.

508. The NFVO sends first result information to the VIM.

The first result information is used to indicate a security verification result of the VNF packet of the VNF. Optionally, step 508 and step 506 may be combined, that is, the first result information may be carried in the second instruction message, and the second instruction message is sent.

509. The VIM determines a security verification result of the VNF packet of the VNF.

When the VIM determines that security verification on the software image of the VNF succeeds, the method further includes the following steps.

510. The VIM connects the VM to the network. The VIM connects the newly created VM to the internal network.

Connecting the VM to the network is connecting the VM to the internal network of the VNF.

511. The VIM sends a resource allocation complete acknowledgment to the NFVO.

According to the software security verification method provided in this embodiment of the present invention, after a first device receives an instantiation request of a VNF and before a second device connects a VM to a network, the first device performs security verification on a stored VNF packet of the VNF when or after starting to instantiate the VNF according to the instantiation request of the VNF, and the first device sends first result information to the second device when security verification on the VNF packet of the VNF succeeds. The first result information includes information that security verification on the VNF packet of the VNF succeeds. Security verification is performed on the VNF packet of the VNF at the same time of executing a procedure of instantiating the VNF. Therefore, compared with the prior art in which security verification is performed on a VNF packet of a VNF before instantiation, in the present invention, time is reduced, a VNF instantiation delay is reduced, and VNF instantiation performance is improved.

Figure 6:
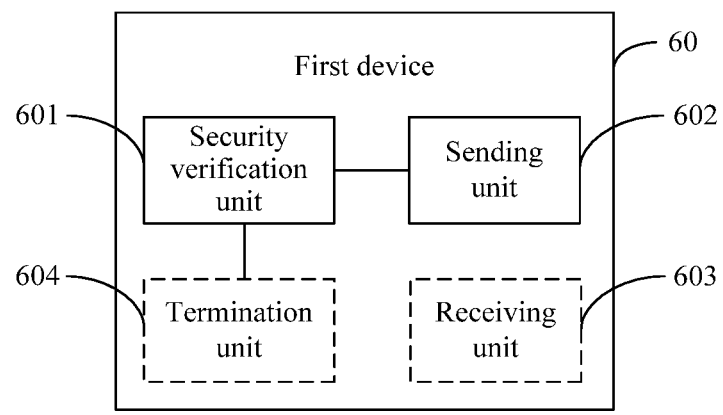
FIG. 6 is a schematic structural diagram of a first device according to an embodiment of the present invention.

Based on the embodiment corresponding to FIG. 2, an embodiment of the present invention provides a first device that is configured to execute the software security verification method described in the embodiment corresponding to FIG. 2. Preferably, the first device may be applied to the network functions virtualization system 10 shown in FIG. 1. The first device provided in this embodiment may be the NFVO 101 in FIG. 1. Referring to FIG. 6, the first device 60 includes a security verification unit 601 and a sending unit 602.

The security verification unit 601 is configured to: after the first device receives an instantiation request of a virtualized network function VNF and when or after the first device starts to instantiate the VNF according to the instantiation request of the VNF, perform security verification on a stored VNF packet of the VNF.

The sending unit 602 is configured to send first result information to a second device when a verification result of the security verification unit 601 indicates that security verification on the VNF packet of the VNF succeeds, so that the second device connects a virtual machine VM to a network after determining, according to the first result information, that security verification on the VNF packet of the VNF succeeds. The VM is a VM created for the VNF by the second device, and the first result information includes information that security verification on the VNF packet of the VNF succeeds.

Optionally, the first device 60 further includes a termination unit 603, configured to terminate VNF instantiation when security verification on the VNF packet of the VNF fails.

Alternatively, the sending unit 602 is further configured to send first result information to a second device when security verification on the VNF packet of the VNF fails. The first result information includes information that security verification on the VNF packet of the VNF fails.

Optionally, in an application scenario, the VNF packet of the VNF includes a software image of the VNF.

The security verification unit 601 is further configured to perform security verification on the software image of the VNF.

Optionally, in another application scenario, the VNF packet of the VNF does not include a software image of the VNF.

The sending unit 602 is further configured to send first instruction information to the second device. The first instruction information is used to instruct the second device to perform security verification on the software image of the VNF, and the software image of the VNF has been stored in the second device.

Specifically, optionally, the sending unit 602 is further configured to send a second instruction message to the second device. The second instruction message is used to instruct the second device to allocate a resource to the VNF and establish a connection for the VNF, the first instruction information is included in the second instruction message.

Alternatively, specifically, optionally, the sending unit 602 is further configured to send a third instruction message to the second device. The third instruction message is used to instruct the second device to perform resource availability check on the VNF, the first instruction information is included in the third instruction message.

The first device 60 further includes a receiving unit 604, configured to receive second result information sent by the second device. The second result information includes a result of performing security verification on the software image of the VNF by the second device.

Optionally, the first device is a network functions virtualization orchestrator NFVO, and the second device is a virtualized infrastructure manager VIM.

According to the first device provided in this embodiment of the present invention, after the first device receives an instantiation request of a VNF and before a second device connects a VM to a network, the first device performs security verification on a stored VNF packet of the VNF when or after starting to instantiate the VNF according to the instantiation request of the VNF, and the first device sends first result information to the second device when security verification on the VNF packet of the VNF succeeds. The first result information includes information that security verification on the VNF packet of the VNF succeeds. Security verification is performed on the VNF packet of the VNF at the same time of executing a procedure of instantiating the VNF. Therefore, compared with the prior art in which security verification is performed on a VNF packet of a VNF before instantiation, in the present invention, time is reduced, a VNF instantiation delay is reduced, and VNF instantiation performance is improved.

Figure 7:
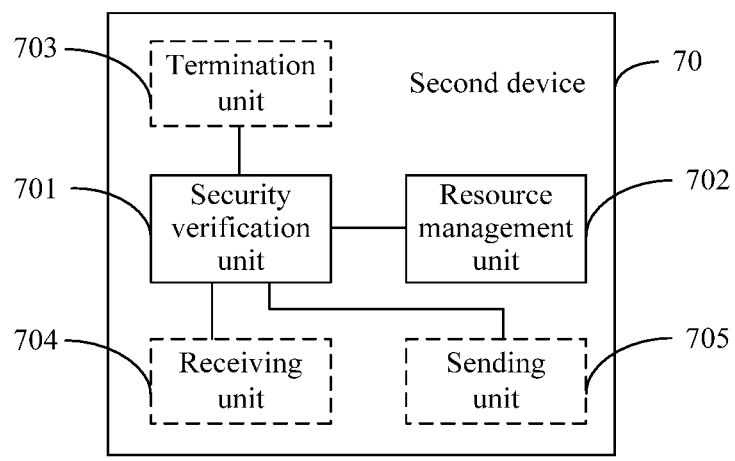
FIG. 7 is a schematic structural diagram of a second device according to an embodiment of the present invention.

Based on the embodiment corresponding to FIG. 3, an embodiment of the present invention provides a second device that is configured to execute the software security verification method described in the embodiment corresponding to FIG. 3. Preferably, the second device may be applied to the network functions virtualization system 10 shown in FIG. 1. The second device provided in this embodiment may be the VIM 103 in FIG. 1. Referring to FIG. 7, the first device 70 includes a security verification unit 701 and a resource management unit 702.

The security verification unit 701 is configured to determine a security verification result of a VNF packet of a VNF.

The resource management unit 702 is configured to connect a virtual machine VM to a network when the security verification unit 701 determines that security verification on the VNF packet of the VNF succeeds. The VM is a VM created for the first virtualized network function VNF by the second device.

Optionally, the second device 70 further includes a termination unit 703, configured to terminate VNF instantiation when the security verification unit 701 determines that security verification on the VNF packet of the VNF fails. VNF instantiation includes connecting the VM to the network.

Optionally, in an application scenario, the second device 70 further includes a receiving unit 704, configured to receive first result information sent by the first device. The first result information includes the security verification result of the VNF packet of the VNF.

The security verification unit 701 is further configured to determine the security verification result of the VNF packet of the VNF according to the first result information received by the receiving unit 704.

Optionally, in another application scenario, the VNF packet of the VNF does not include a software image of the VNF, and the software image of the VNF is stored in the second device.

The receiving unit 70 is configured to receive first instruction information sent by the first device. The first instruction information is used to instruct the second device to perform security verification on the software image of the VNF.

The security verification unit 701 is further configured to: perform security verification on the software image of the VNF according to the first instruction information received by the receiving unit 704, and determine a security verification result of the software image of the VNF.

The resource management unit 702 is further configured to connect the VM to the network when the security verification unit 701 determines that security verification on the VNF packet of the VNF and the software image of the VNF succeeds.

Specifically, optionally, the security verification unit 701 is further configured to perform security verification on the software image of the VNF according to the first instruction information at the same time when the second device creates the VM for the VNF and connects the VM to the network.

Specifically, optionally, the receiving unit 704 is further configured to receive a second instruction message sent by the first device. The second instruction message is used to instruct the second device to allocate a resource to the VNF and establish a connection for the VNF, the first instruction information is included in the second instruction message.

Specifically, optionally, the receiving unit 704 is further configured to receive a third instruction message sent by the first device. The third instruction message is used to instruct the second device to perform resource availability check on the VNF, the first instruction information is included in the third instruction message.

Optionally, the second device 70 further includes a sending unit 705, configured to send second result information to the first device. The second result information includes the result of performing security verification on the software image of the VNF by the second device.

Optionally, the first device is a network functions virtualization orchestrator NFVO, and the second device is a virtualized infrastructure manager VIM.

The second device provided in this embodiment of the present invention determines a security verification result of a VNF packet of a VNF after a first device receives an instantiation request of the VNF and before the second device connects a VM to a network. When the second device determines that security verification on the VNF packet of the VNF succeeds, the second device connects the VM to the network. Security verification is performed on the VNF packet of the VNF at the same time of executing a procedure of instantiating the VNF. Therefore, compared with the prior art in which security verification is performed on a VNF packet of a VNF before instantiation, in the present invention, time is reduced, a VNF instantiation delay is reduced, and VNF instantiation performance is improved.

Figure 8:
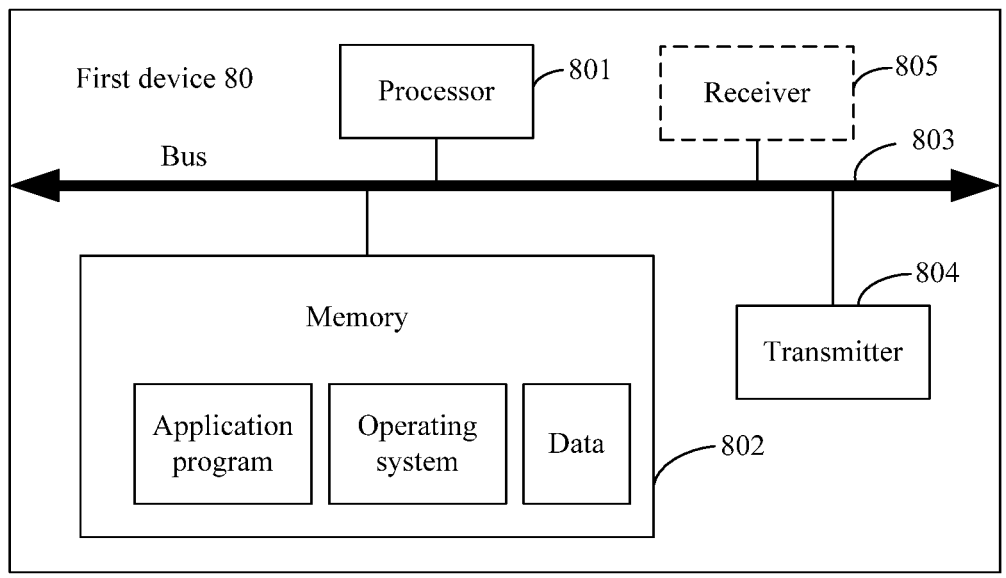
FIG. 8 is a schematic structural diagram of a first device according to another embodiment of the present invention.

Based on the embodiment corresponding to FIG. 2, another embodiment of the present invention provides a first device that is configured to execute the software security verification method described in the embodiment corresponding to FIG. 2. Preferably, the first device may be applied to the network functions virtualization system 10 shown in FIG. 1. The first device provided in this embodiment may be the NFVO 101 in FIG. 1. Referring to FIG. 8, the first device 80 includes at least one processor 801, a memory 802, a bus 803, and a transmitter 804. The at least one processor 801, the memory 802, and the transmitter 804 are connected by using the bus 803 and complete mutual communication.

The bus 803 may be an ISA (industry standard architecture) bus, a PCI (peripheral component interconnect) bus, an EISA (extended industry standard architecture) bus, or the like. The bus 803 may be classified into an address bus, a data bus, a control bus, and the like. For ease of denotation, the bus is represented by using only one thick line in FIG. 8; however, it does not indicate that there is only one bus or only one type of bus.

The memory 802 is configured to store application program code used for executing the solutions of the present invention. The application program code used for executing the solutions of the present invention is stored in the memory and is controlled and executed by the processor 801.

The memory may be a read-only memory ROM or another type of static storage device that can store static information and instructions, a random access memory RAM or another type of dynamic storage device that can store information and instructions, an electrically erasable programmable read-only memory EEPROM, a compact disc read-only memory CD-ROM or another optical disk storage, an optical disc storage (including a compact disc, a laser disc, an optical disc, digital versatile disc, a blue-ray optical disc, and the like), a magnetic disk storage medium or another magnetic storage device, or any other computer-accessible medium that can be used to carry or store expected program code in an instruction or data structure form, without being limited thereto though. These memories are connected to the processor by using the bus.

The processor 801 may be a central processing unit (CPU for short) 801 or an application-specific integrated circuit (ASIC for short), or may be configured as one or more integrated circuits for implementing this embodiment of the present invention.

The processor is configured to: after the first device receives an instantiation request of a virtualized network function VNF and when or after the first device starts to instantiate the VNF according to the instantiation request of the VNF, perform security verification on a stored VNF packet of the VNF.

The transmitter 804 is configured to send first result information to a second device when a verification result of the processor indicates that security verification on the VNF packet of the VNF succeeds, so that the second device connects a virtual machine VM to a network after determining, according to the first result information, that security verification on the VNF packet of the VNF succeeds. The VM is a VM created for the VNF by the second device, and the first result information includes information that security verification on the VNF packet of the VNF succeeds.

Optionally, the processor 801 is further configured to terminate VNF instantiation when security verification on the VNF packet of the VNF fails.

Alternatively, the transmitter 804 is further configured to send first result information to a second device when security verification on the VNF packet of the VNF fails. The first result information includes information that security verification on the VNF packet of the VNF fails.

Optionally, in an application scenario, the VNF packet of the VNF includes a software image of the VNF.

The processor 801 is further configured to perform security verification on the software image of the VNF.

Optionally, in another application scenario, the VNF packet of the VNF does not include a software image of the VNF.

The transmitter 804 is further configured to send first instruction information to the second device. The first instruction information is used to instruct the second device to perform security verification on the software image of the VNF, and the software image of the VNF has been stored in the second device.

Specifically, optionally, the transmitter 804 is further configured to send a second instruction message to the second device. The second instruction message is used to instruct the second device to allocate a resource to the VNF and establish a connection for the VNF, the first instruction information is included in the second instruction message.

Alternatively, specifically, optionally, the transmitter 804 is further configured to send a third instruction message to the second device. The third instruction message is used to instruct the second device to perform resource availability check on the VNF, the first instruction information is included in the third instruction message.

The first device 80 further includes a receiver 805, configured to receive second result information sent by the second device. The second result information includes a result of performing security verification on the software image of the VNF by the second device.

Optionally, the first device is a network functions virtualization orchestrator NFVO, and the second device is a virtualized infrastructure manager VIM.

According to the first device provided in this embodiment of the present invention, after the first device receives an instantiation request of a VNF and before a second device connects a VM to a network, the first device performs security verification on a stored VNF packet of the VNF when or after starting to instantiate the VNF according to the instantiation request of the VNF, and the first device sends first result information to the second device when security verification on the VNF packet of the VNF succeeds. The first result information includes information that security verification on the VNF packet of the VNF succeeds. Security verification is performed on the VNF packet of the VNF at the same time of executing a procedure of instantiating the VNF. Therefore, compared with the prior art in which security verification is performed on a VNF packet of a VNF before instantiation, in the present invention, time is reduced, a VNF instantiation delay is reduced, and VNF instantiation performance is improved.

Figure 9:
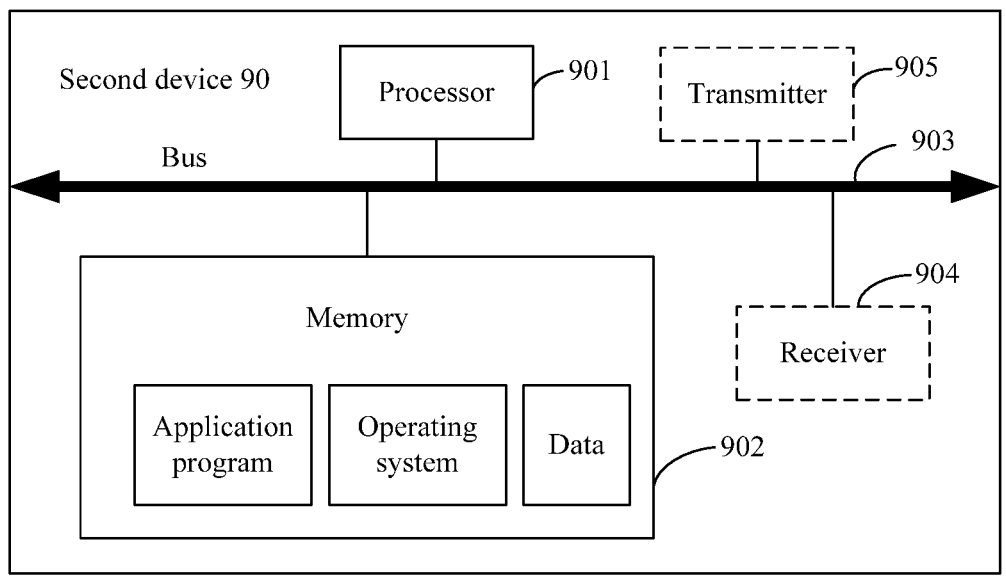
FIG. 9 is a schematic structural diagram of a second device according to another embodiment of the present invention.

Based on the embodiment corresponding to FIG. 3, another embodiment of the present invention provides a second device that is configured to execute the software security verification method described in the embodiment corresponding to FIG. 3. Preferably, the second device may be applied to the network functions virtualization system 10 shown in FIG. 1. The second device provided in this embodiment may be the VIM 103 in FIG. 1. Referring to FIG. 9, the second device 90 includes at least one processor 901, a memory 902, and a bus 903. The at least one processor 901 and the memory 902 are connected by using the bus 903 and complete mutual communication.

The bus 903 may be an ISA bus, a PCI bus, an EISA bus, or the like. The bus 903 may be classified into an address bus, a data bus, a control bus, and the like. For ease of denotation, the bus is represented by using only one thick line in FIG. 9; however, it does not indicate that there is only one bus or only one type of bus.

The memory 902 is configured to store application program code used for executing the solutions of the present invention. The application program code used for executing the solutions of the present invention is stored in the memory and is controlled and executed by the processor 901.

The memory may be a read-only memory ROM or another type of static storage device that can store static information and instructions, a random access memory RAM or another type of dynamic storage device that can store information and instructions, an electrically erasable programmable read-only memory EEPROM, a compact disc read-only memory CD-ROM or another optical disk storage, an optical disc storage (including a compact disc, a laser disc, an optical disc, digital versatile disc, a blue-ray optical disc, and the like), a magnetic disk storage medium or another magnetic storage device, or any other computer-accessible medium that can be used to carry or store expected program code in an instruction or data structure form, without being limited thereto though. These memories are connected to the processor by using the bus.

The processor 901 may be a central processing unit 901 or an application-specific integrated circuit (ASIC for short), or may be configured as one or more integrated circuits for implementing this embodiment of the present invention.

The processor 901 is configured to: determine a security verification result of a VNF packet of a VNF; and connect a virtual machine VM to a network when determining that security verification on the VNF packet of the VNF succeeds. The VM is a VM created for the first virtualized network function VNF by the second device.

Optionally, the processor 901 is further configured to terminate VNF instantiation when determining that security verification on the VNF packet of the VNF fails. VNF instantiation includes connecting the VM to the network.

Optionally, in an application scenario,
the second device 90 further includes a receiver 904, configured to receive first result information sent by a first device. The first result information includes the security verification result of the VNF packet of the VNF.

The processor 901 is further configured to determine the security verification result of the VNF packet of the VNF according to the first result information received by the receiver 904.

Optionally, in another application scenario, the VNF packet of the VNF does not include a software image of the VNF, and the software image of the VNF is stored in the second device.

A receiver 90 is configured to receive first instruction information sent by the first device. The first instruction information is used to instruct the second device to perform security verification on the software image of the VNF.

The processor 901 is further configured to: perform security verification on the software image of the VNF according to the first instruction information received by the receiver 904, and determine a security verification result of the software image of the VNF; and connect the VM to the network when determining that security verification on the VNF packet of the VNF and the software image of the VNF succeeds.

Specifically, optionally, the processor 901 is further configured to perform security verification on the software image of the VNF according to the first instruction information at the same time when the second device creates the VM for the VNF and connects the VM to the network.

Specifically, optionally, the receiver 904 is further configured to receive a second instruction message sent by the first device. The second instruction message is used to instruct the second device to allocate a resource to the VNF and establish a connection for the VNF, the first instruction information is included in the second instruction message.

Specifically, optionally, the receiver 904 is further configured to receive a third instruction message sent by the first device. The third instruction message is used to instruct the second device to perform resource availability check on the VNF, the first instruction information is included in the third instruction message.

Optionally, the second device 90 further includes a transmitter 905, configured to send second result information to the first device. The second result information includes the result of performing security verification on the software image of the VNF by the second device.

Optionally, the first device is a network functions virtualization orchestrator NFVO, and the second device is a virtualized infrastructure manager VIM.

The second device provided in this embodiment of the present invention determines a security verification result of a VNF packet of a VNF after a first device receives an instantiation request of the VNF and before the second device connects a VM to a network. When the second device determines that security verification on the VNF packet of the VNF succeeds, the second device connects the VM to the network. Security verification is performed on the VNF packet of the VNF at the same time of executing a procedure of instantiating the VNF. Therefore, compared with the prior art in which security verification is performed on a VNF packet of a VNF before instantiation, in the present invention, time is reduced, a VNF instantiation delay is reduced, and VNF instantiation performance is improved.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A software security verification method, comprising:
receiving, by a first device, an instantiation request to instantiate a virtualized network function (VNF);
performing, by the first device, security verification on a stored VNF packet of the VNF during an instantiation process of the VNF started by the first device according to the instantiation request of the VNF, wherein the security verification on the stored VNF packet of the VNF comprises authenticating the stored VNF packet of the VNF;
sending, by the first device, first result information to a second device when security verification on the VNF packet of the VNF succeeds, wherein:
a software image of the stored VNF packet is stored in the second device; and
the first result information comprises information indicating that the security verification on the VNF packet of the VNF succeeds;
sending, by the first device, first instruction information to the second device, wherein the first instruction information is configured to instruct the second device to perform security verification on the software image of the VNF; and
receiving, by the first device, second result information from the second device, wherein the second result information comprises a result of performing security verification on the software image of the VNF by the second device.

2. The method according to claim 1, wherein the method further comprises:
when security verification on the VNF packet of the VNF fails, terminating, by the first device, VNF instantiation, or sending, by the first device, first result information to the second device, wherein the first result information comprises information that security verification on the VNF packet of the VNF fails.

3. The method according to claim 1, wherein the VNF packet of the VNF comprises a software image of the VNF; and
performing, by the first device, security verification on the stored VNF packet of the VNF comprises:
performing, by the first device, security verification on the software image of the VNF.

4. The method according to claim 1, wherein
the first device is a network functions virtualization orchestrator (NFVO), and the second device is a virtualized infrastructure manager (VIM).

5. A software security verification method, comprising:
determining, by a second device, a security verification result of a virtualized network function (VNF) packet of a VNF, wherein:

the security verification result is a result of a security verification on a stored VNF packet of the VNF during an instantiation process of the VNF started by a first device according to an instantiation request of the VNF received by the first device; and
a software image of the stored VNF packet of the VNF is stored in the second device;
receiving, by the second device, first instruction information sent by a first device, wherein the first instruction information is configured to instruct the second device to perform security verification on the software image of the VNF;
performing, by the second device, security verification on the software image of the VNF according to the first instruction information, and determining a security verification result of the software image of the VNF;
sending, by the second device, second result information to the first device, wherein the second result information comprises the result of performing security verification on the software image of the VNF by the second device; and
connecting, by the second device, a virtual machine (VM) to a network when the security verification on the VNF packet of the VNF succeeds and the software image of the VNF succeeds, wherein the VM is a VM created for the VNF by the second device.

6. The method according to claim 5, wherein the method further comprises:
terminating, by the second device, the VNF instantiation process when the security verification on the VNF packet of the VNF fails, wherein the VNF instantiation process comprises connecting the VM to the network.

7. The method according to claim 5, wherein determining, by the second device, the security verification result of the VNF packet of the VNF comprises:
receiving, by the second device, first result information from the first device, wherein the first result information comprises the security verification result of the stored VNF packet of the VNF.

8. A first device, comprising a processor, a memory, a bus, and a transmitter, wherein the processor, the memory, and the transmitter are connected to each other by using the bus;
the processor is configured to:
receive an instantiation request to instantiate a virtualized network function (VNF);
during an instantiation process of the VNF started by first device according to the instantiation request of the VNF, perform security verification on a stored VNF packet of the VNF;
and
the transmitter is configured to:
send first result information to a second device when a verification result of the processor indicates that security verification on the VNF packet of the VNF succeeds, wherein:
a software image of the stored VNF packet is stored in the second device; and
the first result information comprises information that security verification on the VNF packet of the VNF succeeds;
send first instruction information to the second device, wherein the first instruction information is configured to instruct the second device to perform security verification on the software image of the VNF; and
receive second result information from the second device, wherein the second result information comprises a result of performing security verification on the software image of the VNF by the second device.

9. The device according to claim 8, wherein
the processor is further configured to terminate VNF instantiation when security verification on the VNF packet of the VNF fails; or
the transmitter is further configured to send first result information to the second device when security verification on the VNF packet of the VNF fails, wherein the first result information comprises information that security verification on the VNF packet of the VNF fails.

10. The device according to claim 8, wherein the VNF packet of the VNF comprises a software image of the VNF; and
the processor is further configured to perform security verification on the software image of the VNF.

11. A second device, comprising:
a processor,
a memory,
a bus, wherein the processor and the memory are connected to each other by using the bus; and the processor is configured to:
determine a security verification result of a virtualized network function (VNF) packet of a VNF, wherein the security verification result is a result of a security verification on a stored VNF packet of the VNF during an instantiation process of the VNF started by a first device according to an instantiation request of the VNF received by the first device; and
connect a virtual machine VM to a network when determining that security verification on the VNF packet of the VNF succeeds, wherein the VM is a VM created for the VNF by the second device; and
a transmitter, wherein the transmitter is configured to send second result information to the first device, wherein the second result information comprises the result of performing security verification on the software image of the VNF by the second device.

12. The device according to claim 11, wherein
the processor is further configured to terminate VNF instantiation when determining that security verification on the VNF packet of the VNF fails, wherein VNF instantiation comprises connecting the VM to the network.

13. The device according to claim 11, wherein
the second device further comprises a receiver, configured to receive first result information from a first device, wherein the first result information comprises the security verification result of the VNF packet of the VNF; and
the processor is further configured to determine the security verification result of the VNF packet of the VNF according to the first result information received by the receiver.

14. The device according to claim 11, wherein a software image of the stored VNF packet of the VNF is stored in the second device;
the second device further comprises a receiver, configured to receive first instruction information sent by the first device, wherein the first instruction information is configured to instruct the second device to perform security verification on the software image of the VNF; and
the processor is further configured to:
perform security verification on the software image of the VNF according to the first instruction information received by the receiver;
determine a security verification result of the software image of the VNF; and
connect the VM to the network when determining that security verification on the VNF packet of the VNF and the software image of the VNF succeeds.

* * * * *